United States Patent
Akita

(10) Patent No.: US 7,082,154 B2
(45) Date of Patent: Jul. 25, 2006

(54) POWER CONTROL CIRCUIT AND POWER CONTROL METHOD

(75) Inventor: Hidenori Akita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 609 days.

(21) Appl. No.: 10/012,505

(22) Filed: Dec. 12, 2001

(65) Prior Publication Data

US 2003/0053567 A1    Mar. 20, 2003

(30) Foreign Application Priority Data

Sep. 17, 2001  (JP)  ............................. 2001-281404

(51) Int. Cl.
*H04B 1/707* (2006.01)
*H04B 7/005* (2006.01)

(52) U.S. Cl. .................. 375/147; 375/130; 375/227; 375/347; 455/522

(58) Field of Classification Search ................ 375/340, 375/130, 136, 147, 148, 220, 316, 144, 227, 375/347, 349; 455/522; 370/335, 342, 441
See application file for complete search history.

(56) References Cited

U.S. PATENT DOCUMENTS

| | | | | |
|---|---|---|---|---|
| 5,590,409 A | * | 12/1996 | Sawahashi et al. | ......... 455/522 |
| 5,604,766 A | * | 2/1997 | Dohi et al. | .................. 375/130 |
| 5,623,484 A | * | 4/1997 | Muszynski | ................... 370/335 |
| 6,138,033 A | * | 10/2000 | Kitade et al. | ................ 455/522 |
| 6,178,194 B1 | * | 1/2001 | Vasic | .......................... 375/136 |
| 6,404,826 B1 | * | 6/2002 | Schmidl et al. | ............. 375/147 |
| 6,414,948 B1 | * | 7/2002 | Sato | ............................ 370/335 |
| 6,426,971 B1 | * | 7/2002 | Wu et al. | .................... 375/227 |
| 6,526,031 B1 | * | 2/2003 | Zaff et al. | .................... 370/335 |
| 6,556,839 B1 | * | 4/2003 | Kondo | ........................ 455/522 |
| 6,587,696 B1 | * | 7/2003 | Ma et al. | ..................... 455/522 |
| 6,690,944 B1 | * | 2/2004 | Lee et al. | .................... 455/522 |
| 6,754,253 B1 | * | 6/2004 | Guey | ........................... 375/148 |
| 6,856,644 B1 | * | 2/2005 | Wang et al. | ................ 375/130 |

* cited by examiner

*Primary Examiner*—Betsy L. Deppe
(74) *Attorney, Agent, or Firm*—Nixon Peabody LLP; Donald R. Studebaker

(57) ABSTRACT

A power control circuit including a first SIR measurement section which obtains separate SIR measurement values for a plurality de-spread signals, a combining section which combines the plurality of de-spread signals, a second SIR measurement section which obtains an SIR measurement value for the signal combined in the combining section, an observation section which observes fluctuations in the separate SIR measurement values and the SIR measurement value; and a control section which controls transmitting power of the de-spread signal based on observation results from the observation section.

6 Claims, 4 Drawing Sheets

POWER CONTROL CIRCUIT AND POWER CONTROL METHOD

BACKGROUND OF THE INVENTION

1. Field of the Invention

The present invention relates to digital wireless communication, and particularly to a power control circuit and a power control method used in wireless communications using a CDMA (Code Division Multiple Access) system.

This application is a counterpart of Japanese patent application, Serial Number 281404/2001, filed Sep. 17, 2001, the subject matter of which is incorporated herein by reference.

2. Description of the Related Art

Initially, in the field of CDMA systems, a plurality of mobile stations shared the same frequency band, and signals to other mobile station became interference signals. In particular, attenuation of radio waves is inversely proportional to the square of distance in free space, which means that signals of a base station and mobile stations close to the base station have a significant effect on signals between the base station and mobile stations remote from the base station (near-far problem). In order to solve this near-far problem, it is necessary to make the transmission power of the base station and the mobile station constant, irrespective of the position of the mobile station. To paraphrase the problem, it is necessary to perform control so that SIR (signal-to-interference plus noise power ratio) is constant.

A description will now be given of a conventional power control circuit, using the drawings. FIG. 4 is a block diagram of a conventional power control circuit provided in a mobile station. The conventional power control circuit controls transmission power of a transmission signal from a base station to a mobile station (downlink). The conventional power control circuit comprises an A/D converter 401, a low pass filter (LPF) section 402, N de-spread sections 403, a combining control section 404, a path combining section 405, an SIR measurement section 406, an SIR reference value determination section 407, and an SIR comparison section 408.

Operation of the conventional power control circuit will now be described. The A/D converter 401 converts a receive signal (analog signal) received from a base station into a digital signal. The LPF section 402 removes high frequency components of the converted digital signal, and passes only low frequency components. The de-spread sections 403 carry out de-spread on the receive signals having passed through the LPF section 402, and output a narrowband modulation signal from which spread is removed. Here, a plurality of de-spread sections 403 are provided, corresponding to a plurality of receive signals (paths). The path combining section 405 controls timing and reliability of each path based on the output from the combining control section 404, and creates each path. The SIR measurement section 406 estimates receive SIR based on pilot data 405a of a combined signal.

In the following, estimated receive SIR will be termed SIR measurement value 406a. Also, the SIR reference value determination section 407 determines an SIR reference value based on data 405b of the combined signal. In the following the determined receive SIR reference value will be termed SIR reference value 407a. The SIR reference value is determined using a receive signal error rate etc. The error rate is obtained using receive signal CRC (cyclic redundancy check) data. The SIR comparison section 408 compares the SIR measurement value 406a with the SIR reference value 407a to output control information. Specifically, if the SIR measurement value 406a is greater than the SIR reference value 407a, a control signal to lower the transmit power of the downlink is output. On the other hand, if the SIR measurement value 406a is smaller than the SIR reference value 407a, a control signal to raise the transmit power of the downlink is output.

However, due to shadowing or the like, there are occasions when the receive signal is attenuated suddenly, and the receive signal falls significantly. As a result, there is a problem that communication quality deteriorates, or there is a danger that disconnection will arise.

SUMMARY OF THE INVENTION

The object of the present invention is to provide a power control circuit to alleviate deterioration in communication quality and the possibility of disconnection due to rapid attenuation in a receive signal.

An outline representative example of the invention disclosed in the present application will now be described simply in the following.

Specifically, the power control section of this application comprises a plurality of de-spread sections for de-spread a receive signal and outputting a modulation signal, a plurality of first estimation sections for estimating receive SIR of each modulation signal and outputting first estimation values, a synthesizing section for synthesizing a plurality of modulation signals, a reference value determination section for calculating an SIR reference value based on the combined modulation signals, a second estimation section for estimating receive SIR based on pilot data of the combined modulation signals and outputting a second estimation value, a comparison section for comparing the SIR reference value with the second estimation value, an observation section for observing fluctuations in receive SIR based on the first and second estimation values, and a power control information determination section for determining power control information based on comparison results from the comparison section, and fluctuation results from the observation section.

With the above described means, it is possible to provide a power control circuit that alleviates communications quality deterioration and the possibility of disconnection due to rapid attenuation of a receive signal.

DETAILED DESCRIPTION OF THE PREFERRED EMBODIMENTS

Figure 1:
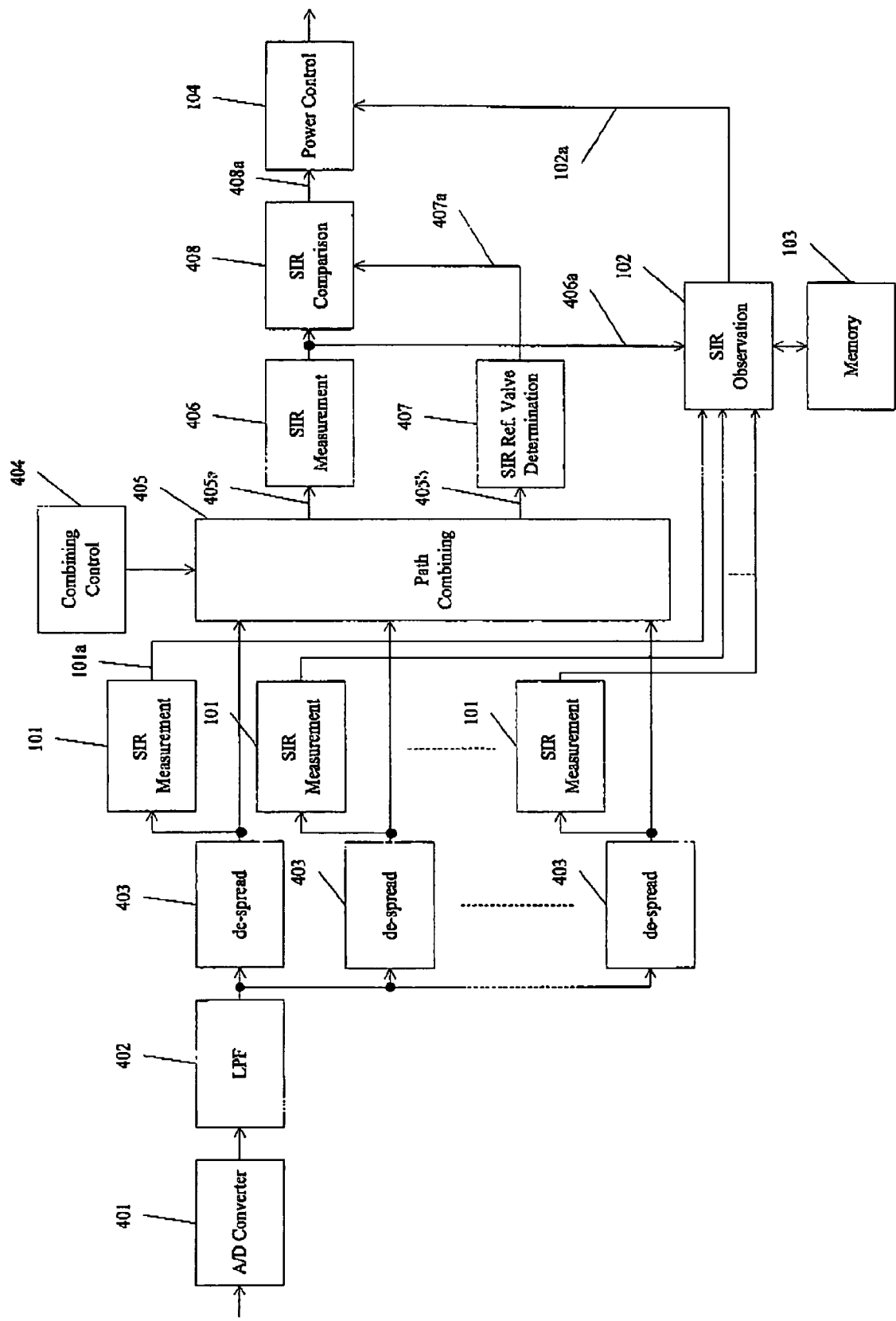
FIG. 1 is a block diagram showing a power control circuit of an embodiment of the present invention.
Figure 2:
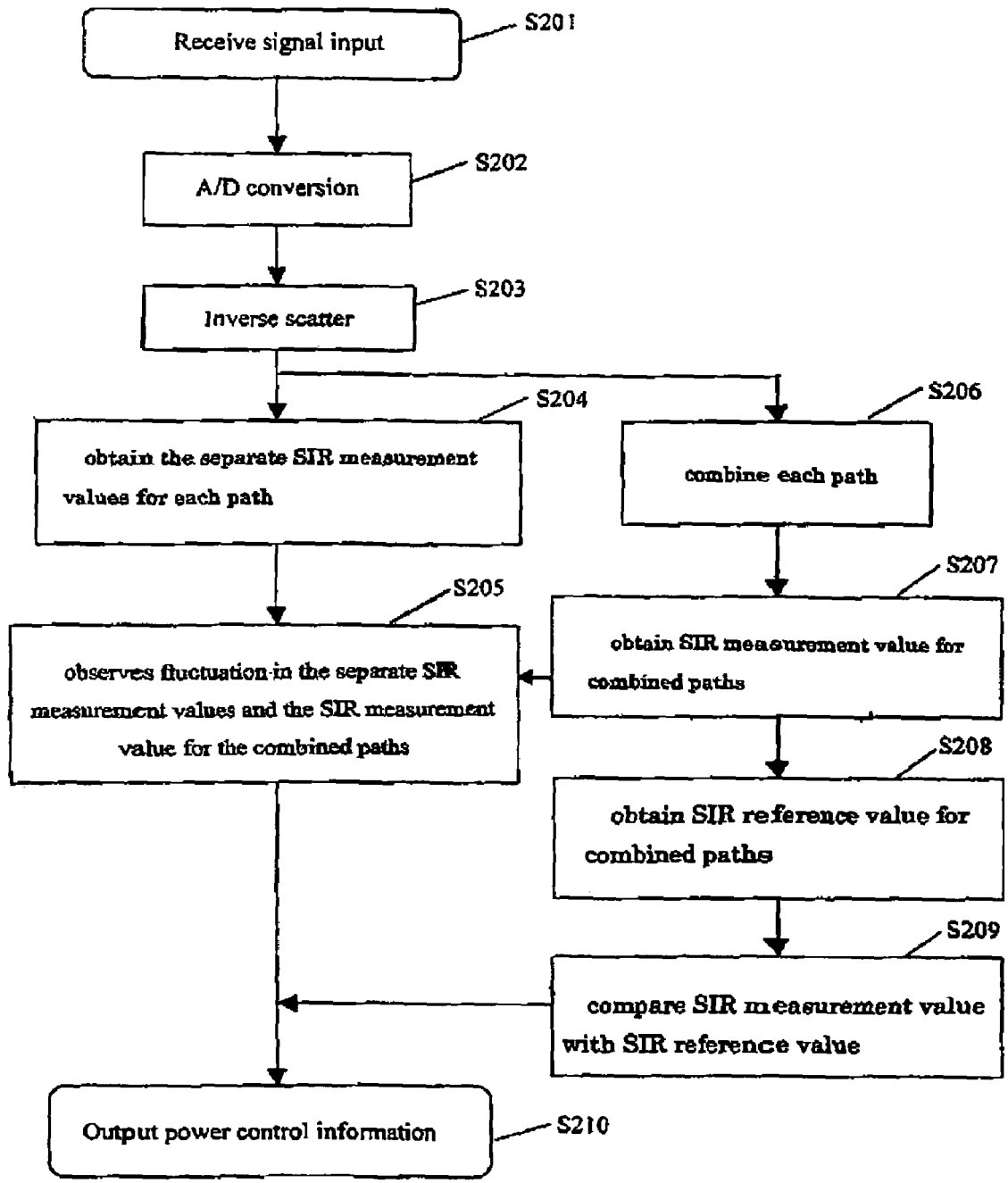
FIG. 2 is a flow chart showing operation of the power control circuit of the embodiment of the present invention.
Figure 3:
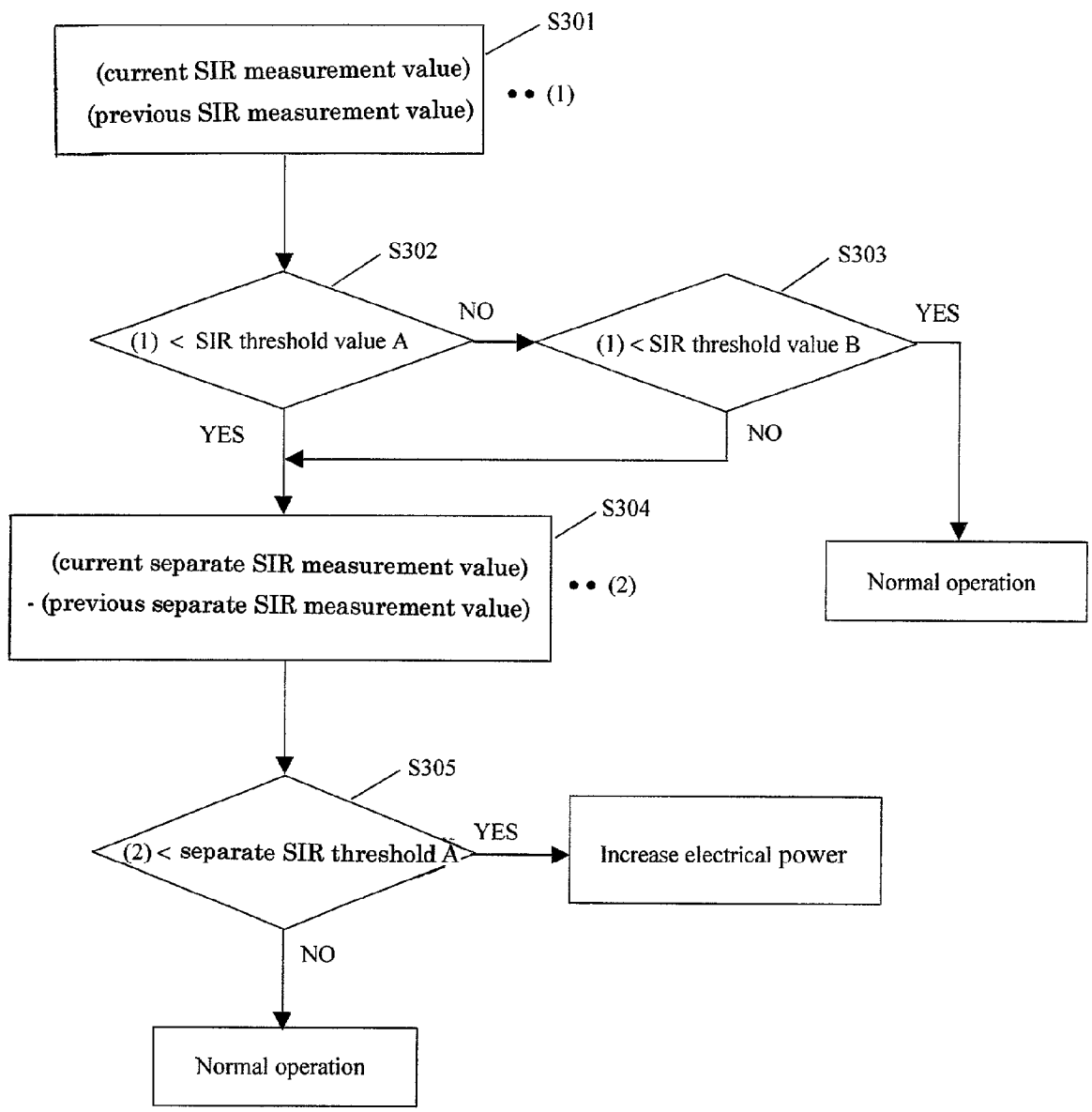
FIG. 3 is a flow chart showing operation of an SIR measurement section of the embodiment of the present invention.
Figure 4:
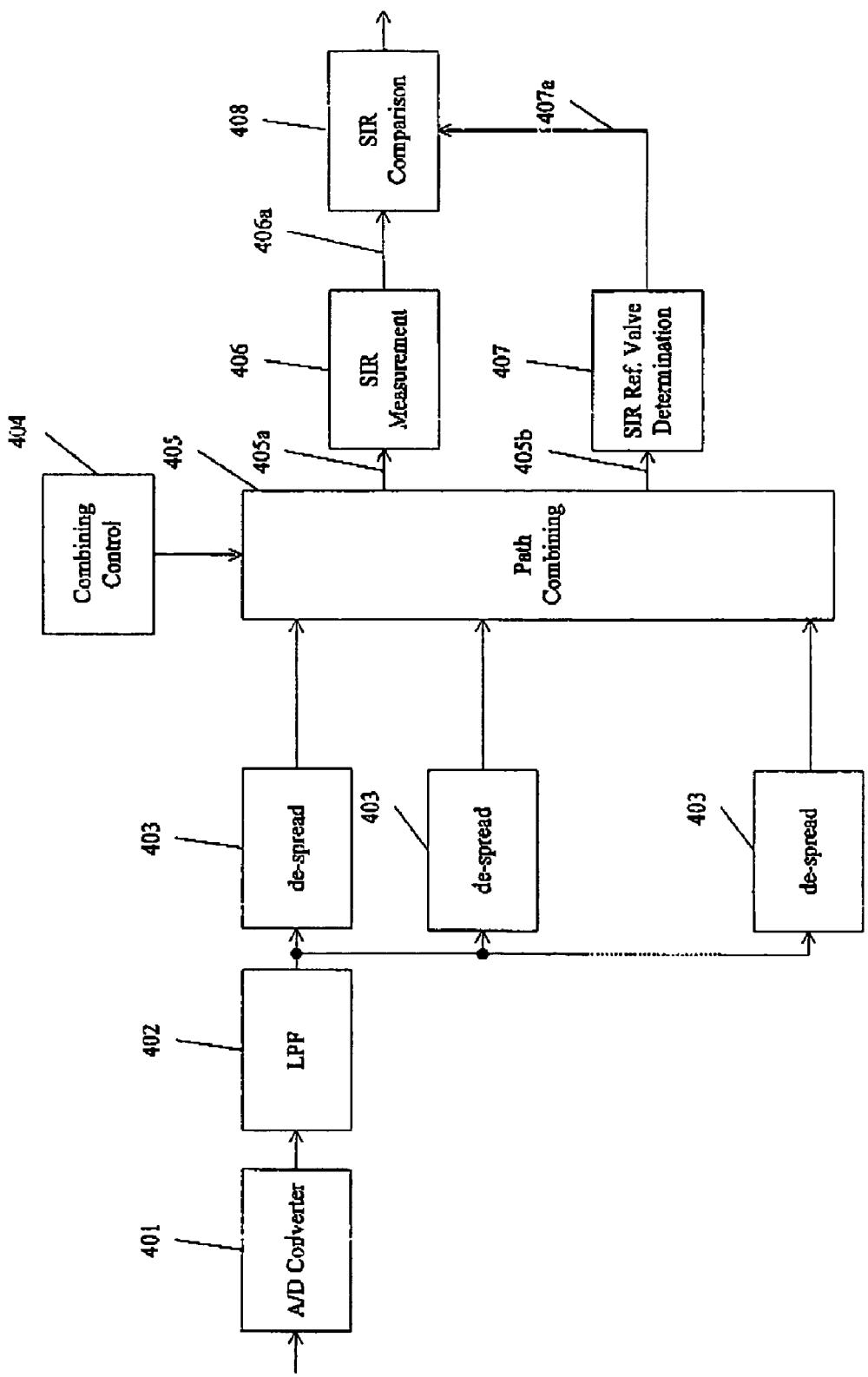
FIG. 4 is a block diagram of a conventional power control circuit.

An embodiment of the present invention will now be described in detail based on the drawings, using FIG. 1 to FIG. 3. FIG. 1 is a block diagram showing a power control circuit of an embodiment of the present invention. FIG. 2 is a flow chart showing operation of the power control circuit of the embodiment of the present invention. FIG. 3 is a flow chart showing operation of a SIR measurement section of the embodiment of the present invention.

First of all, using FIG. 1, the structure of the power control circuit of the embodiment of the present invention will be described. The power control circuit of the embodiment of the present invention comprises an A/D converter 401, a low pass filter (LPF) section 402, a plurality of de-spread sections 403, a plurality of separate SIR measurement sections 101, a combining control section 404, a path combining section 405, a SIR observation section 102, a memory section 103, a SIR measurement section 406, a SIR reference value determination section 407, a SIR comparison section 408 and a power control section 104.

Here, the A/D converter 401 is connected to the LPF section 402. The LPF section 402 is connected to the plurality of de-spread sections 403. Each de-spread section 403 is connected to a separate SIR measurement section 101 and the path combining section 405. The path combining section 405 is connected to the combining control section 404, the SIR measurement section 406 and the SIR reference value determination section 407. The SIR measurement section 406 is connected to the SIR observation section 102 and the SIR comparison section 408. The SIR reference value determination section 407 is connected to the SIR comparison section 408. The SIR comparison section 408 is connected to the power control section 104. Also, separate SIR measurement sections 101 are connected to the SIR observation section 102. The SIR observation section 102 is connected to the memory section 103 and the power control section 104.

Next, using FIG. 2, the operation of the power control circuit of the embodiment of the present invention will be described. The power control circuit of the embodiment of the invention receives a receive signal from a base station via an antenna (S201). The A/D converter 401 converts the receive signal, which is an analog signal, to a digital signal (S202). The LPF section 402 removes high frequency components of the converted digital signal, and passes only low frequency components. The de-spread sections 403 carry out de-spread on the receive signals having passed through the LPF section 402, and output a narrowband modulation signal from which spread is removed (S203). Here, a plurality of de-spread sections 403 are provided, and de-spread is carried out for a plurality of receive signals (paths). The SIR measurement section 101 estimates a receive SR for each path. Specifically, receive SIR is estimated based on pilot data of modulation signals output from the de-spread sections 403. In the following, estimated receive SIR will be termed separate SIR measurement value 101a. On the other hand, the path combining section 405 controls timing and reliability of each path based on a control signal output from the combining control section 404 and combines each path (S206). The SIR measurement section 406 estimates receive SIR based on pilot data 405a of a combined signal. In the following, estimated receive SIR will be termed SIR measurement value 406a (S207). The SIR reference value determination section 407 determines a receive SIR reference value based on data 405b of the combined signal (S208). In the following the determined receive SIR reference value will be termed SIR reference value 407a Here, the SIR reference value is determined using a receive signal error rate etc. The error rate is obtained using receive signal CRC (cyclic redundancy check) data. The SIR comparison section 408 compares the SIR measurement value 406a with the SIR reference value 407a and outputs comparison results 408a (S209).

On the other hand, the SIR observation section 102 receives as inputs the separate SIR measurement values 101a output from the SIR measurement section 101 (S204), and the SIR measurement value 406a output from the SIR measurement section 406 (S207). The SR observation section 102 observes the separate SIR measurement values 101a and the SIR measurement value 406a and outputs observation results (S205). In the following, the observation results are termed SIR fluctuation information 102a. Here, the memory section 103 stores separate SIR measurement values 101a and the SIR measurement value 406a input to the SIR observation section 102, as well as the SIR fluctuation information 102a. The power control section 104 outputs information for controlling the electrical power of the downlink (S210) based on the comparison results 408a and the SIR fluctuation information 102a.

Using FIG. 3, operation of the SIR observation section 102 of the embodiment of the present invention will now be described. First of all, the SIR observation section 102 of the embodiment of the invention subtracts an SIR value for a combined signal obtained previously, from an SIR measurement value for a combined signal currently obtained (S301). Here, the previously obtained SIR measurement value is stored in the memory 103. Next, the SIR observation section 102 compares a subtraction result (1) calculated in S301 and a predetermined SIR threshold value A (S302). Here, if the subtraction result (1) is greater than the SIR threshold value A (first SIR threshold value), the subtraction result (1) is compared with a SIR threshold value B (second SIR threshold value) (S303). Here, if the subtraction result (1) is smaller than the SIR threshold value B (that is, the SIR threshold value A<subtraction result (1)<SIR threshold B), the SIR observation section 102 judges that sudden path attenuation is not taking place. The SIR observation section 102 outputs fluctuation information 102a instructing execution of normal operation. On the other hand, if the subtraction result (1) is smaller than the SIR threshold A, or larger than the SIR threshold B, the SIR observation section 102 judges that sudden path attenuation or the like is taking place. Then, the SIR observation section 102 subtracts an SIR measurement value for an individual path obtained previously from an SIR measurement value for an individual path currently obtained (S304). Here, the previously obtained SIR measurement value is stored in the memory 103. Next, the SIR observation section 102 compares the subtraction result (2) calculated in step S304 with a predetermined separate SIR threshold value A (S305). Here, if the subtraction result (2) is smaller than the SIR threshold value A (a first separate SIR threshold value), the SIR observation section 102 judges that sudden path attenuation is taking place. Then, the SIR observation section 102 outputs fluctuation information 102a instructing to increase electricity. On the other hand, if the subtraction result (2) is larger than the SIR threshold value A (first separate SIR threshold value), the SIR observation section 102 judges that sudden path attenuation is not taking place. The SIR observation section 102 outputs fluctuation information 102a instructing normal operation. Here, the SIR threshold values A, B and the separate SIR threshold values A, B are configured so that a user or a system designer can freely set them by field trials.

The following effects are achieved with the power control circuit of the embodiment of the invention.

The power control circuit of the embodiment of the present invention compares a difference between a receive SIR for a receive signal currently being received and a receive SIR obtained from a receive signal received before this, with predetermined threshold values. Larger electricity than normal is then supplied when the receive signal is suddenly attenuated. Accordingly, the power control circuit of the embodiment of the present invention makes it possible to provide an electrical power control circuit that can respond rapidly to sudden attenuation of the receive signal and can reduce deterioration in communication quality and the possibility of disconnection.

A description has been specifically given above based on an embodiment of the present invention made by the inventor of the present invention, but the present invention is not limited to the above embodiment and various modifications are possible without departing from the spirit of the invention.

Effects obtained with the representative example of the invention disclosed in the present application will now be described simply in the following.

The present invention makes it possible to provide a power control circuit that alleviates deterioration in communication quality and the possibility of disconnection due to rapid attenuation in a receive signal.

What is claimed is:

1. A power control circuit controlling a transmitting power, comprising:
    a first despread circuit despreading a received signal, which generates a first despread signal;
    a second despread circuit despreading the received signal, which generates a second despread signal;
    a first SIR (signal-to-interference plus noise power ratio) measurement circuit which generates a first SIR measurement value according to the first despread signal;
    a second SIR measurement circuit which generates a second SIR measurement value according to the second despread signal;
    a combining circuit which combines the first and second despread signals;
    a third SIR measurement circuit which generates a third SIR measurement value according to the combined signal;
    a memory which stores previous first, second and third SIR measurement values;
    an observation circuit which generates an observation, wherein the observation circuit comprises
    a first subtracter which subtracts the previous third SIR measurement value from a current third SIR measurement value and generates a first subtraction result;
    a first comparator which compares the first subtraction result and a first threshold value;
    a second subtracter which subtracts the previous first SIR measurement value from a current first SIR measurement value and generates a second subtraction result when the first subtraction result is less than the first threshold value; and
    a second comparator which compares the second subtraction result and a second threshold value and generates an observation result and a control circuit which controls the transmitting power according to the observation result.

2. The power control circuit according to claim 1, wherein the observation circuit further comprises:
    a third comparator which compares the first subtraction result and a third threshold value when the first subtraction result is greater than the first threshold value.

3. The power control circuit in accordance with claim 1, further comprising:
    a SIR reference value determination circuit which generates a SIR reference value according to the combined signal; and
    a comparison circuit which compares the SIR reference value and the third SIR measurement value;
    wherein the control circuit controls the transmitting power according to the observation result and the comparison result.

4. A power control method controlling a transmitting power, comprising:
    despreading a received signal so as generate a first despread signal;
    despreading the received signal so as to generate a second despread signal;
    combining the first and second despread signals so as to generate a combined signal;
    generating a first SIR (signal-to-interference plus noise power ratio) measurement value based on the first despread signal;
    generating a second SIR measurement value based on the second despread signal;
    generating a third SIR measurement value based on the combined signal;
    storing previous first, second and third SIR measurement values;
    subtracting the previous third SIR measurement value from a current third SIR measurement value so as to generate a first subtraction result;
    comparing the first subtraction result and a first threshold value;
    subtracting the previous first SIR measurement value from a current first SIR measurement value so as to generate a second subtraction result when the first subtraction result is less than the first threshold value;
    comparing the second subtraction result and a second threshold value so as to generate the observation result; and
    controlling the transmitting power according to the observation result.

5. The power control method according to claim 4, further comprising comparing the first subtraction result and a third threshold value when the first subtraction result is greater than the first threshold value.

6. The power control method according to claim 4, further comprising:
    generating a SIR reference value according to the combined despread signal; and
    comparing the SIR reference value and the third SIR measurement value.

* * * * *